United States Patent
Park et al.

(10) Patent No.: US 9,560,586 B2
(45) Date of Patent: Jan. 31, 2017

(54) COMMUNICATION METHOD IN WIRELESS LOCAL AREA NETWORK SYSTEM

(75) Inventors: Jong Hyun Park, Anyang-si (KR); Hyang Sun You, Anyang-si (KR); Eun Sun Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 14/232,804

(22) PCT Filed: Jul. 19, 2012

(86) PCT No.: PCT/KR2012/005760
§ 371 (c)(1),
(2), (4) Date: Jan. 14, 2014

(87) PCT Pub. No.: WO2013/012263
PCT Pub. Date: Jan. 24, 2013

(65) Prior Publication Data
US 2014/0153469 A1    Jun. 5, 2014

Related U.S. Application Data

(60) Provisional application No. 61/509,546, filed on Jul. 19, 2011, provisional application No. 61/568,656, filed on Dec. 9, 2011.

(51) Int. Cl.
*H04W 52/02*   (2009.01)
*H04W 76/04*   (2009.01)
*H04W 84/04*   (2009.01)

(52) U.S. Cl.
CPC ..... *H04W 52/0203* (2013.01); *H04W 52/0216* (2013.01); *H04W 76/048* (2013.01); *H04W 84/047* (2013.01)

(58) Field of Classification Search
CPC .. H04W 52/02; H04W 72/04; H04W 52/0203; H04W 52/0216; H04W 76/048; H04W 84/047; G08C 17/00; H04B 7/212
(Continued)

(56) References Cited

U.S. PATENT DOCUMENTS 6,192,230 B1 * 2/2001 van Bokhorst ... H04W 52/0216
370/311
7,379,435 B1 * 5/2008 Kinder .................. H04L 12/189
370/320
(Continued)

FOREIGN PATENT DOCUMENTS

KR     10-2011-0069643        6/2011

OTHER PUBLICATIONS

Braun, et al., "Power Saving in Wireless Ad hoc Networks Without Synchronization," 5th Scandinavian Workshop on Wireless Ad-hoc Networks, 4 pages.
(Continued)

*Primary Examiner* — Khaled Kassim
(74) *Attorney, Agent, or Firm* — Lee Hong Degerman Kang Waimey

(57) ABSTRACT

A communication method performed by a target station in a WLAN system is provided. The method includes receiving a relayed TIM message from a relay station, the TIM message comprising a relayed TIM field indicating whether there is buffered traffic intended to be transmitted from an AP to the target station, determining whether there is the buffered traffic based on the relayed TIM field, receiving a data frame related to the buffered traffic, if the relayed TIM field indicates that there is the buffered traffic, and switching to a doze state, if the relayed TIM field indicates that there is no buffered traffic. The relayed TIM field is determined based on a TIM element transmitted from the AP to the relay
(Continued)

station. The TIM element is transmitted in a first period, and the relayed TIM message is transmitted in a second period.

12 Claims, 15 Drawing Sheets

(58) Field of Classification Search
USPC .......................................... 370/311, 328, 345
See application file for complete search history.

(56) References Cited

U.S. PATENT DOCUMENTS

| | | | | |
|---|---|---|---|---|
| 8,010,168 | B2* | 8/2011 | Benveniste | H04W 28/10 455/127.5 |
| 2002/0131484 | A1* | 9/2002 | Diepstraten | H04L 7/04 375/222 |
| 2003/0231608 | A1* | 12/2003 | Wentink | H04W 92/18 370/338 |
| 2005/0047386 | A1* | 3/2005 | Yi | H04W 68/025 370/345 |
| 2006/0089138 | A1* | 4/2006 | Smith | H04W 52/0229 455/426.1 |
| 2006/0146769 | A1* | 7/2006 | Patel | H04W 52/0229 370/338 |
| 2006/0165031 | A1* | 7/2006 | Wang et al. | 370/328 |
| 2007/0211727 | A1 | 9/2007 | Sethi et al. | |
| 2008/0219196 | A1* | 9/2008 | Ptasinski | H04W 52/02 370/311 |
| 2008/0298290 | A1* | 12/2008 | Wentink | H04W 52/0216 370/311 |
| 2009/0010191 | A1* | 1/2009 | Wentink | H04W 52/0216 370/311 |
| 2009/0279464 | A1* | 11/2009 | Kakani et al. | 370/311 |
| 2010/0135195 | A1* | 6/2010 | Sakoda | H04W 76/048 370/311 |
| 2010/0226302 | A1* | 9/2010 | Bar | H04W 28/14 370/312 |
| 2011/0261740 | A1* | 10/2011 | Loc et al. | 370/311 |
| 2012/0038475 | A1* | 2/2012 | Lee | G08B 25/009 340/502 |
| 2013/0250832 | A1* | 9/2013 | Kim | H04W 52/0216 370/311 |
| 2014/0328238 | A1* | 11/2014 | Seok | H04W 74/04 370/311 |

OTHER PUBLICATIONS

Korean Intellectual Property Office Application Serial No. 10-2014-7001046, Office Action dated Feb. 12, 2015, 5 pages.

* cited by examiner

FIG. 8

| Category | Action | Length | Max Transmit Power | Location Info | Listen Interval | Duty Cycle | STA Type | Discovery Timeout Value |
|---|---|---|---|---|---|---|---|---|
| 810 | 820 | 830 | 840 | 850 | 860 | 870 | 880 | 890 |
| 1 | 1 | 1 | 1 | 1 | 2 | 2 | 1 | 1 |

Octets:

800

COMMUNICATION METHOD IN WIRELESS LOCAL AREA NETWORK SYSTEM

CROSS-REFERENCE TO RELATED APPLICATIONS

This application is the National Stage filing under 35 U.S.C. 371 of International Application No. PCT/KR2012/005760, filed on Jul. 19, 2012, which claims the benefit of U.S. Provisional Application Ser. No. 61/509,546, filed on Jul. 19, 2011, and 61/568,656, filed on Dec. 9, 2011, the contents of which are all hereby incorporated by reference herein in their entirety.

TECHNICAL FIELD

The present invention relates to wireless communication and, more particularly, to a communication method in a Wireless Local Area Network (WLAN) system and an apparatus for supporting the same.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

Meanwhile, as the propagation of a WLAN is being activated, there appears an environment in which one AP provides service to a large number of non-AP STAs. Furthermore, as mobile devices type non-AP STAs which support a WLAN are increased, there is a need for a method of supporting increased mobility.

An environment in which a plurality of STAs is placed in one WLAN system may include, for example, a Machine to Machine (M2M) network. Unlike the existing WLAN system in which a person accesses an AP through a non-AP STA and receives service, the M2M refers to a network in which a machine supporting WLAN communication becomes the subject and exchanges pieces of information.

The introduction of a WLAN system supporting M2M and an increase in the mobility of an STA may be associated with the operation of an STA based on the battery. For this reason, the power management of an STA may become more important. Accordingly, there is a need for an efficient communication method in terms of the power management of an STA in this WLAN environment.

SUMMARY OF INVENTION

Technical Problem

The present invention provides a communication method performed by a station in a WLAN system and an apparatus for supporting the same.

Solution to Problem

In an aspect, a communication method performed by a target station in a Wireless Local Area Network (WLAN) system is provided. The communication method includes: receiving a relayed Traffic Indication Map (TIM) message from a relay station, wherein the TIM message comprises a relayed TIM field indicating whether or not there is buffered traffic intended to be transmitted from an Access Point (AP) to the target station; determining whether or not there is the buffered traffic based on the relayed TIM field; receiving a data frame related to the buffered traffic, if the relayed TIM field indicates that there is the buffered traffic; and switching to a doze state, if the relayed TIM field indicates that there is no buffered traffic. The relayed TIM field is determined based on a TIM element transmitted from the AP to the relay station. The TIM element is transmitted in a first period in which communication between the relay station and the AP is permitted. The relayed TIM message is transmitted in a second period in which communication between the relay station and the target station is permitted.

The relayed TIM field may comprise a bitmap sequence and the bitmap sequence may indicate whether or not there is the buffered traffic intended to be transmitted from the AP in relation to each station whose communication with the relay station is permitted for the second period.

The step of determining whether or not there is the buffered traffic based on the relayed TIM field may include determining whether a relevant bit of a bitmap sequence corresponding to the target station indicates the buffered traffic or not.

The method may further include transmitting a TIM relay request message requesting the relay station to transmit the relayed TIM message, to the relay station and receiving a TIM relay response message from the relay station in response to the TIM relay request message.

The TIM relay response message may include a relay identification information field and the relay identification information field may include identification information about the target station related to order of the relevant bit in the bitmap sequence.

The TIM relay request message may include a requester identification information field and the requester identification information field may include an Association IDentifier (AID) allocated when the target station is associated with the AP.

The identification information of the target station may be determined based on the AID.

The data frame may be received from the AP.

The data frame may be received from the relay station.

The data frame may be received by the relay station from the AP for the first period and be relayed to the target station for the second period.

The method may further include receiving a beacon frame from the AP. The beacon frame may include information indicating the first period and the second period.

The relayed TIM message and the data frame may be transmitted through a direct link set up between the target station and the relay station.

Maximum transmit power permitted for the second period may be lower than maximum transmit power permitted for the first period.

In another aspect a wireless apparatus operated in a Wireless Local Area Network (WLAN) system is provided. The wireless apparatus includes: a transceiver configured to transmit and receive radio signals; and a processor functionally connected to the transceiver. The process is configured to: receive a relayed Traffic Indication Map (TIM) message from a relay station, wherein the TIM message comprises a relayed TIM field indicating whether or not there is buffered traffic intended to be transmitted from an Access Point (AP) to the wireless apparatus; determine whether or not there is the buffered traffic based on the relayed TIM field; receive a data frame related to the buffered traffic, if the relayed TIM field indicates that there is the buffered traffic; and switch to a doze state, if the relayed TIM field indicates that there is no buffered traffic. The relayed TIM field is determined based on a TIM element transmitted from the AP to the relay station. The TIM element is transmitted in a first period in which communication between the relay station and the AP is permitted. The relayed TIM message is transmitted in a second period in which communication between the relay station and the wireless apparatus is permitted.

Advantageous Effects of Invention

The present invention proposes a communication method based on relay in a WLAN system supporting M2M. An unchargeable STA may be operated in an awake state for a period in which transmission and reception using low transmit power are permitted in order to exchange frames with a chargeable STA and may be operated in a doze state for a period in which transmission and reception using full transmit power are permitted. Furthermore, an unchargeable STA may exchange frames with an AP through the relay function of a chargeable STA although it uses relatively low transmit power. Accordingly, power efficiency of an unchargeable STA having limited power can be improved, and the lifespan of the unchargeable STA can be increased.

The present invention proposes a Traffic Indication Map (TIM) protocol based on relay. An unchargeable STA receives information related to a TIM element, transmitted by an AP, from a chargeable STA and check TIM information. Accordingly, an unchargeable STA can also perform a power saving operation normally in an M2M WLAN system based on relay.

BRIEF DESCRIPTION OF DRAWINGS

FIG. 8 is a block diagram showing the format of the DLS discovery request frame according to an embodiment of the present invention.

MODE FOR THE INVENTION

Figure 1:
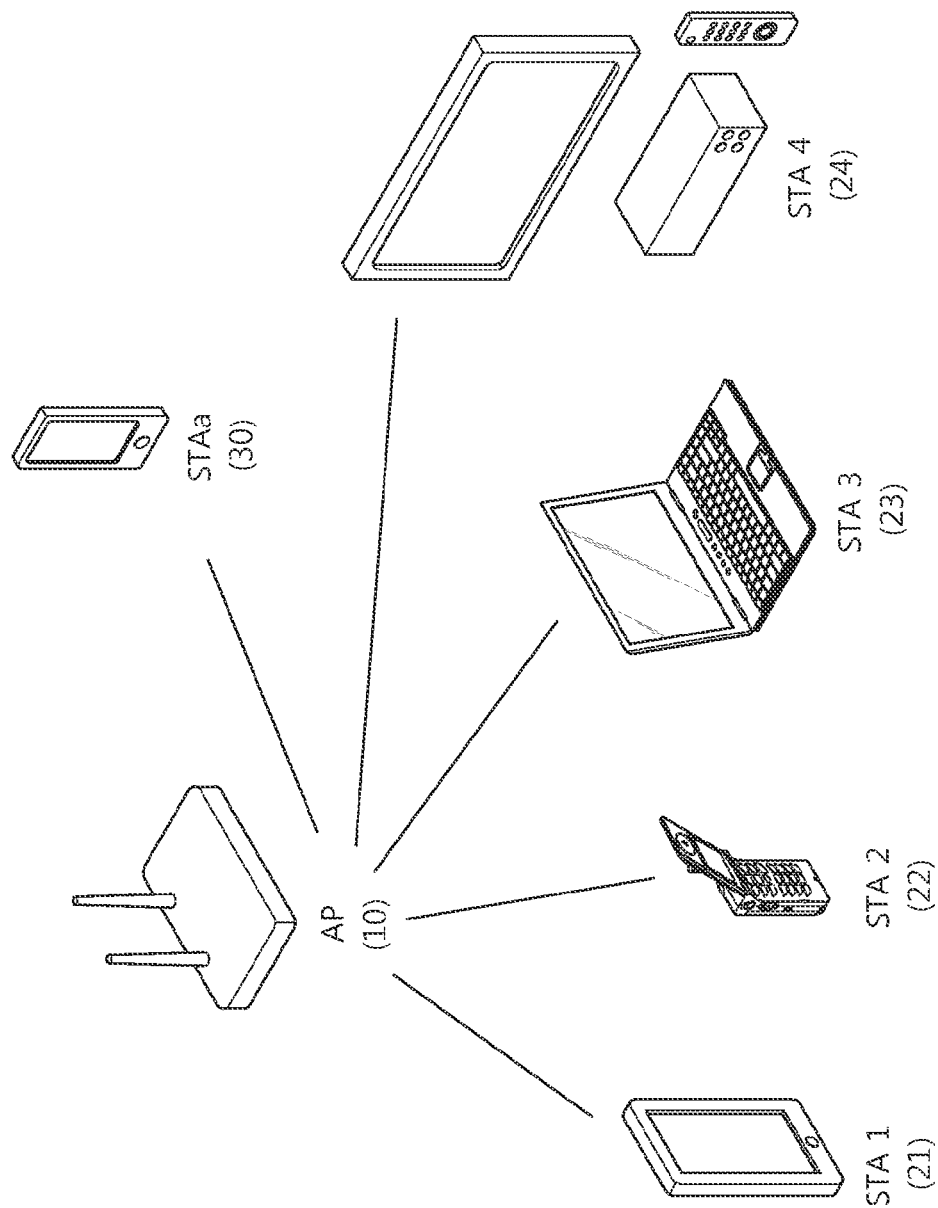
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1 21, STA2 22, STA3 23, STA4 24, and STAa 30, an AP (Access Point) 10 providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be inter-connected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS) of a WLAN, and QoS data can be transmitted in both a Contention Period (CP) and a Contention-Free Period (CFP).

In a wireless communication system, an STA cannot know the existence of a network immediately when the STA is turned on and the STA starts operating from a viewpoint of a wireless medium. Accordingly, any type of an STA should perform a network discovery process in order to access a network. The STA that has discovered networks through the network discovery process selects a network to be joined through a network selection process. Next, the STA joins the selected network and performs a data exchange operation performed in a transmission terminal/reception terminal.

In a WLAN system, a network discovery process is embodied by a scanning procedure. The scanning procedure is divided into passive scanning and active scanning. Passive scanning is performed based on a beacon frame that is periodically broadcasted by an AP. In general, in a WLAN, an AP broadcasts a beacon frame at a specific interval (e.g., 100 msec). The beacon frame includes information about a BSS managed by the beacon frame. An STA waits passively in order to receive the beacon frame in a specific channel. The STA obtains information about a network from the received beacon frame and then terminates the scanning procedure in the specific channel. Passive scanning is advantageous in that overall overhead is small because the passive scanning is performed if an STA has only to receive a beacon frame without a need to transmit an additional frame, but is disadvantageous in that the time taken to perform scanning is increased in proportion to the transmission period of a beacon frame.

In contract, in active scanning, an STA broadcasts a probe request frame actively in a specific channel and requests information about networks from all APs that have received the probe request frame. An AP that has received the probe request frame waists for a random time in order to prevent a collision between frames and transmits a probe response frame, including information about a network, to the STA. The STA receives the probe response frame, obtains the information about networks from the probe response frame, and then terminates the scanning procedure. Active scanning is advantageous in that scanning can be finished within a relatively short time, but is disadvantageous in that overall network overhead is increased because a frame sequence according to a request and a response is necessary.

The STA that has finished the scanning procedure selects a network according to its specific criterion and then, together with the AP, performs an authentication procedure. The authentication procedure is performed according to a 2-way handshake. The STA that has finished the authentication procedure, together with the AP, performs an association procedure.

The association procedure is performed according to a 2-way handshake. First, the STA transmits an association request frame to the AP. The association request frame includes information about the capabilities of the STA. The AP determines whether or not to permit association with the STA based on the information about the capabilities. The AP that has determined whether or not to permit association with the STA transmits an association response frame to the STA. The association response frame includes information indicating whether association has been permitted or not and information indicating a reason when association is permitted or failed. The association response frame further includes information about capabilities supportable by the AP. If the association is successfully completed, frames are normally exchanged between the AP and the STA. If the association is failed, the association procedure is attempted again based on information about a failure reason included in the association response frame or the STA may request association from another AP.

In order to overcome a limit to the communication speed that was considered as being weakness in a WLAN, IEEE 802.11n has been recently established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver.

As a WLAN is actively propagated and applications employing the WLAN are diversified, there is a need for a new WLAN system that supports a throughput higher than the data processing speed supported by IEEE 802.11n. The next-generation WLAN system that supports a Very High Throughput (VHT) is a next version of an IEEE 802.11n WLAN system and is one of IEEE 802.11 WLAN systems which have recently been newly proposed in order to support a data processing speed of 1 Gbps or higher in a MAC Service Access Point (SAP).

The next-generation WLAN system supports transmission using a Multi-User Multiple Input Multiple Output (MU-MIMO) method in which a plurality of STAs accesses a radio channel at the same time so that the channel can be efficiently used. In the MU-MIMO transmission method, an AP can transmit a packet to one or more MIMO-paired STAs.

If channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA. A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period. According to this operation, the AP can transmit the frame to the STA. This will be described with reference to FIG. 2.

Figure 2:
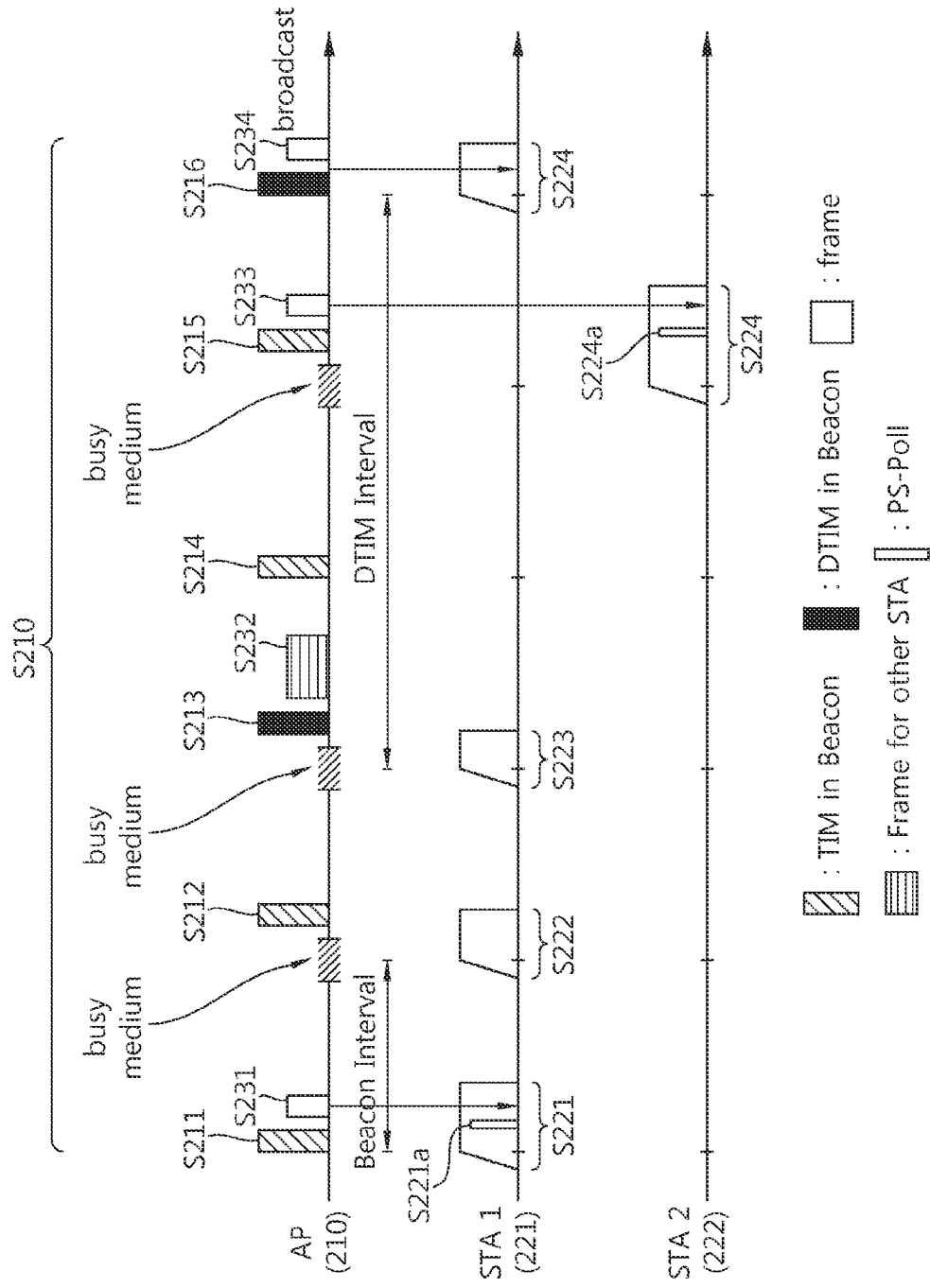
FIG. 2 shows an example of a power management operation.

FIG. 2 shows an example of a power management operation.

Referring to FIG. 2, an AP 210 transmits a beacon frame to STAs in a BSS in accordance with a specific period (step S210). The beacon frame includes a traffic indication map (TIM) information element. The TIM element includes information for reporting that the AP 210 has buffered traffic for which the STAs associated with and a frame will be transmitted. Examples of the TIM element include a TIM used to report a unicast frame and a delivery traffic indication map (DTIM) used to report a multicast or broadcast frame.

The AP 210 transmits the DTIM one time whenever a beacon frame is transmitted three times.

An STA1 221 and an STA2 222 are STAs operating in a PS mode. The STA1 221 and the STA2 222 can be configured such that they can transition from a doze state to an awake state in every wakeup interval of a specific period to receive the TIM element transmitted by the AP 210.

A specific wakeup interval can be configured such that the STA1 221 transitions to the awake state in every beacon interval to receive the TIM element. Therefore, the STA1 221 transitions to the awake state (step S221) when the AP 210 transmits a first beacon frame (step S211). The STA1 221 receives the beacon frame and acquires the TIM element. If the acquired TIM element indicates that there is a frame to be transmitted to the STA1 221, then the STA1 221 transmits to the AP 210 a PS poll frame that requests the AP 210 to transmit a frame (step S221a). The AP 210 transmits the frame to the STA1 221 in response to the PS poll frame (step S231). Upon completion of frame reception, the STA1 221 operates by transitioning back to the doze state.

When the AP 210 transmits a second beacon frame, a medium is busy, that is, another device accesses to the medium for example. Thus, the AP 210 may not be able to transmit the beacon frame in accordance with a correct beacon interval but may transmit it at a delayed time point (step S212). In this case, the STA1 221 switches its mode to the wake state in accordance with the beacon interval, but cannot receive the beacon frame transmitted with delay, and thus transitions back to the doze state (step S222).

When the AP 210 transmits a third beacon frame, the beacon frame may include a TIM element which is configured as a DTIM. However, since the medium is busy, the AP 210 transmits the beacon frame with delay (step S213). The STA1 221 operates by transitioning to the awake state in accordance with the beacon interval, and can acquire the DTIM by using the beacon frame transmitted by the AP 210. The DTIM acquired by the STA1 221 indicates that there is no frame to be transmitted to the STA1 221 and there is a frame for another STA. Therefore, the STA1 221 operates by transitioning back to the doze state. After transmitting the beacon frame, the AP 210 transmits the frame to a corresponding STA (step S232).

The AP 210 transmits a fourth beacon frame (step S214). However, since the STA1 221 cannot acquire information indicating that there is buffered traffic for the STA1 221 by receiving the TIM element two times, the STA1 221 may regulate a wakeup interval for receiving the TIM element. Alternatively, if signaling information for regulating a wakeup interval value of the STA1 221 is included in the beacon frame transmitted by the AP 210, the wakeup interval value of the STA1 221 may be regulated. Instead of transitioning an operation state for every beacon interval to receive the TIM element, the STA1 221 can be configured in the present embodiment such that the operation state is transitioned one time for every three beacon intervals. Therefore, the STA1 221 cannot acquire a corresponding TIM element since the AP 210 transmits the fourth beacon frame (step S214), and maintains the doze state when a fifth beacon frame is transmitted (step S215).

When the AP 210 transmits a sixth beacon frame (step S216), the STA1 221 operates by transitioning to the awake state, and acquires the TIM element included in the beacon frame (step S224). The TIM element is a DTIM that indicates existence of a broadcast frame, and thus the STA1 221 receives the broadcast frame transmitted by the AP 210 (step S234) instead of transmitting a PS poll frame to the AP 210.

Meanwhile, the wakeup interval assigned to the STA2 222 may have a longer period than that of the STA1 221. Therefore, the STA2 222 can receive the TIM element by transitioning to the awake state (step S225) when the fifth beacon frame is transmitted (step S215). The STA2 222 knows existence of a frame to be transmitted to the STA2 222 by using the TIM element, and transmits a PS poll frame to the AP 210 to request transmission (step S225*a*). The AP 210 transmits a frame to the STA2 222 in response to the PS poll frame (step S233).

In order to operate the PS mode of FIG. 2, the TIM element includes a TIM that indicates whether there is a frame to be transmitted to the STA or a DTIM that indicates whether there is a broadcast/multicast frame. The DTIM may be implemented by configuring a field of the TIM element.

A detailed response procedure of the STA that receives the TIM element can be described below with reference to FIG. 3 to FIG. 5.

Figure 3:
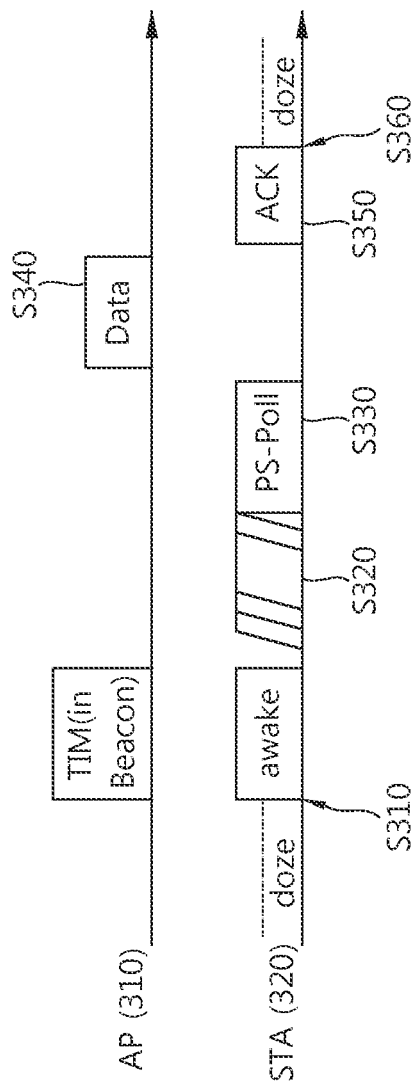
FIG. 3 shows an example of a response procedure of an AP in a TIM protocol.

FIG. 3 shows an example of a response procedure of an AP in a TIM protocol.

Referring to FIG. 3, an STA 320 switches its operation state from a doze state to an awake state to receive a beacon frame including a TIM from an AP 310 (step S310). The STA 320 interprets a received TIM element and thus can know whether there is buffered traffic to be delivered to the STA 320.

The STA 320 contends with other STAs to access to a medium for transmitting a PS poll frame (step S320), and transmits the PS poll frame to request the AP 310 to transmit a data frame (step S330).

Upon receiving the PS poll frame transmitted by the STA 320, the AP 310 transmits a data frame to the STA 320. The STA2 320 receives the data frame, and transmits an acknowledgment (ACK) frame to the AP 310 in response thereto (step S350). Thereafter, the STA2 320 switches its operation mode back to the doze state (step S360).

Instead of immediate response of FIG. 3 in which the data frame is transmitted immediately after receiving the PS poll frame from the STA, the AP may transmit data at a specific time point after receiving the PS poll frame.

Figure 4:
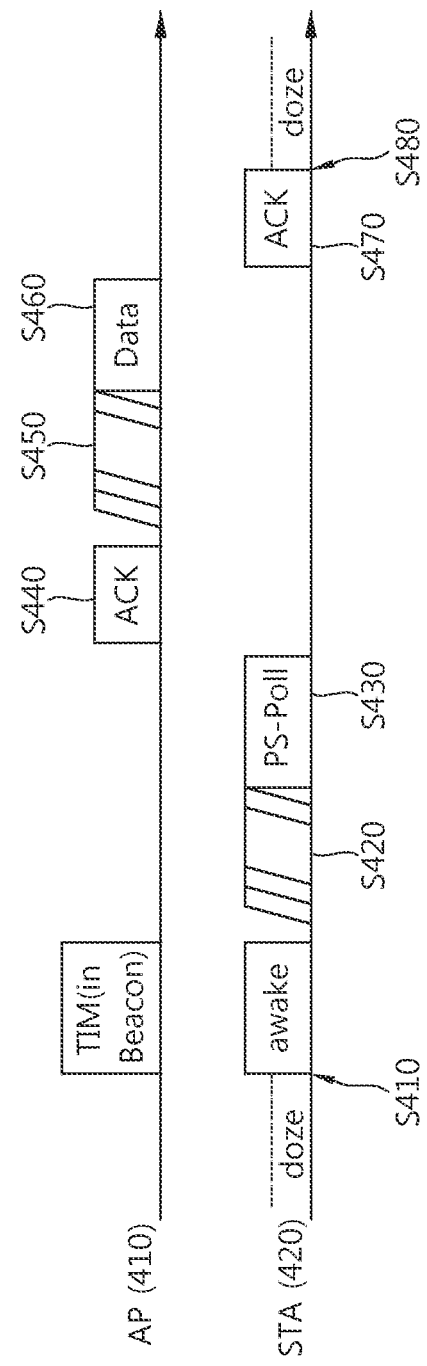
FIG. 4 shows another example of a response procedure of an AP in a TIM protocol.

FIG. 4 shows another example of a response procedure of an AP in a TIM protocol.

Referring to FIG. 4, an STA 420 switches its operation state from a doze state to an awake state to receive a beacon frame including a TIM from an AP 410 (step S410). The STA 420 interprets a received TIM element and thus can know whether there is buffered traffic to be delivered to the STA 420.

The STA 420 contends with other STAs to access to a medium for transmitting a PS poll frame (step S420), and transmits the PS poll frame to request the AP 410 to transmit a data frame (step S430).

If the AP 410 receives the PS poll frame but fails to prepare for a data frame during a specific time interval such as a short inter-frame space (SIFS), instead of directly transmitting the data frame, the AP 410 transmits an ACK frame to the STA 420 (step S440). This is a characteristic of a deferred response which is different from step S340 of FIG. 3 in which the AP 310 directly transmits the data frame to the STA 320 in response to the PS poll frame.

The AP 410 performs contending when the data frame is prepared after transmitting the ACK frame (step S450), and transmits the data frame to the STA 420 (step S460).

The STA 420 transmits an ACK frame to the AP 410 in response to the data frame (step S470), and switches its operation mode to the doze state (step S480).

When the AP transmits a DTIM to the STA, a subsequent procedure of a TIM protocol may differ.

Figure 5:
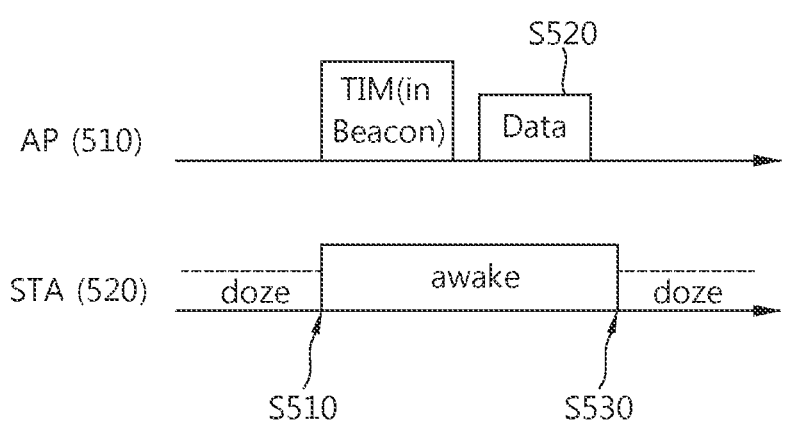
FIG. 5 shows a procedure of a TIM protocol based on a DTIM.

FIG. 5 shows a procedure of a TIM protocol based on a DTIM.

Referring to FIG. 5, an STA 520 switches its operation state from a doze state to an awake state to receive a beacon frame including a TIM from an AP 510 (step S510). The STAs 520 can know that a multicast/broadcast frame will be transmitted by using the received DTIM.

After transmitting a beacon frame including the DTIM, the AP 520 transmits the multicast/broadcast frame (step S520). After receiving the multicast/broadcast frame transmitted by the AP 510, the STAs 520 switch the operation state back to the doze state (step S530).

In the power save mode operation method based on the TIM protocol described with reference to FIG. 2 to FIG. 5, STAs can determine whether there is a data frame to be transmitted for buffered traffic by using STA identifying information included in the TIM element. The STA identifying information may be information related to an association identifier (AID) as an identifier assigned when the STA is associated with an AP. The STA identifying information may be configured to directly indicate AIDs of STAs having buffered traffic or may be configured in a bitmap type in which a bit order corresponding to an AID value is set to a specific value. The STAs can know that there is buffered traffic for them if the STA identifying information indicates their AIDs.

Meanwhile, with the recent advent of various communication services, such as smart grid, e-Health, and ubiquitous, Machine to Machine (M2M) technology for supporting the various communication services has been in the spotlight. Each of a sensor for detecting temperature or humidity, a camera, home appliances, such as TV, a process machine in a factory, and a large machine, such as a vehicle, may become one of elements that form an M2M system. Elements forming the M2M system may transmit and receive data based on WLAN communication. A case where elements forming an M2M system support a WLAN and configure a network is hereinafter called an M2M WLAN system.

A WLAN system supporting M2M has the following characteristics.

1) A large number of STAs: It is assumed that the M2M includes a number of STAs within a BSS, unlike in the existing network. This is because not only devices owned by a person, but also sensors, etc. installed in a home or company are taken into consideration. Accordingly, numerous STAs may be connected to one AP.

2) A low traffic load per STA: In an M2M system, an STA does not need to transmit information frequently and the amount of the information is relatively small because the STA has a traffic pattern that pieces of surrounding information are gathered and reported.

3) Communication focused on uplink: The M2M is chiefly configured to receive a command in downlink, take action, and report resulting data in uplink. In a system supporting the M2M, uplink becomes the center because major data is commonly transmitted in uplink.

4) The power management of an STA: An M2M terminal is chiefly operated by the battery, and it is difficult for a user to charge the battery frequently. Accordingly, there is a need for a power management method of minimizing battery consumption.

5) An automatic recovery function: a device forming an M2M system needs an autonomous recovery function because it is difficult for a person to directly manipulate the device in a specific situation.

From among the characteristics of a WLAN system which supports the M2M, in particular, a communication environment in which numerous STAs are connected to an AP may becomes an embodiment to which communication methods proposed by the present invention may be effectively applied. Accordingly, in describing the embodiments of the present invention hereinafter, a WLAN system which supports the M2M is described as an example. The communication method proposed by the present invention is not limited to a WLAN system supporting the M2M, but may be applied to common WLAN systems and communication systems.

The most common server/client structure, from among the existing network models other than the M2M is described below. In most cases, a client (i.e., an STA) requests information from a server, and the server transmits relevant information (or data) to the STA. The server that provides the information may be considered as a machine which collects pieces of information mechanically and provides the collected information. The subject that has received the information becomes a user that has used the client (i.e., the STA). The characteristic of this network model corresponds to a reason why lots of communication techniques have been developed based on downlink.

In a network which supports the M2M, however, the structure is reversed. In other words, the client (i.e., the STA), that is, the machine, functions to collect pieces of information and provide the information. In contrast, a user that manages the server requests the information. That is, in an M2M WLAN system, a network model in which a server issues a command, such as the measurement of surrounding environments, to an M2M STA, and an STA performs sensing in response to the command and reports the results of the sensing to the server is common. In other words, unlike in the existing mode, it can be seen that a user accesses a network on the server side and the direction in the flow of information is reversed. Accordingly, for effective M2M communication, the functions of the existing STA need to be reduced, and a management function in a network needs to be expanded.

From this point of view, it can be seen that network management technology has to be taken into consideration again in an M2M WLAN system. In the previous network model, the network management function is also given to an STA because a user is placed on the STA side. In the M2M system, however, it is necessary to enhance the network management function on the server side because an STA has only to provide information in response to a command.

In a WLAN system supporting the M2M, however, several thousands of STAs connected to an AP may be taken into consideration in embodying an actual system. In this case, a method in which one STA occupies the same wireless medium and performs communication at once by using the existing CSMA/CS method may have a limit to effective network management. For example, unlike in the existing 2.4 GHz or 5 GHz, if a WLAN is operated in a band of 1 GHz or less represented by 700 to 900 MHz, the same transmit power versus to the coverage of an AP may be expanded about 2 to 3 times owing to the propagation characteristic of the band. It leads to a characteristic that a larger number of STAs is connected to one AP.

Figure 6:
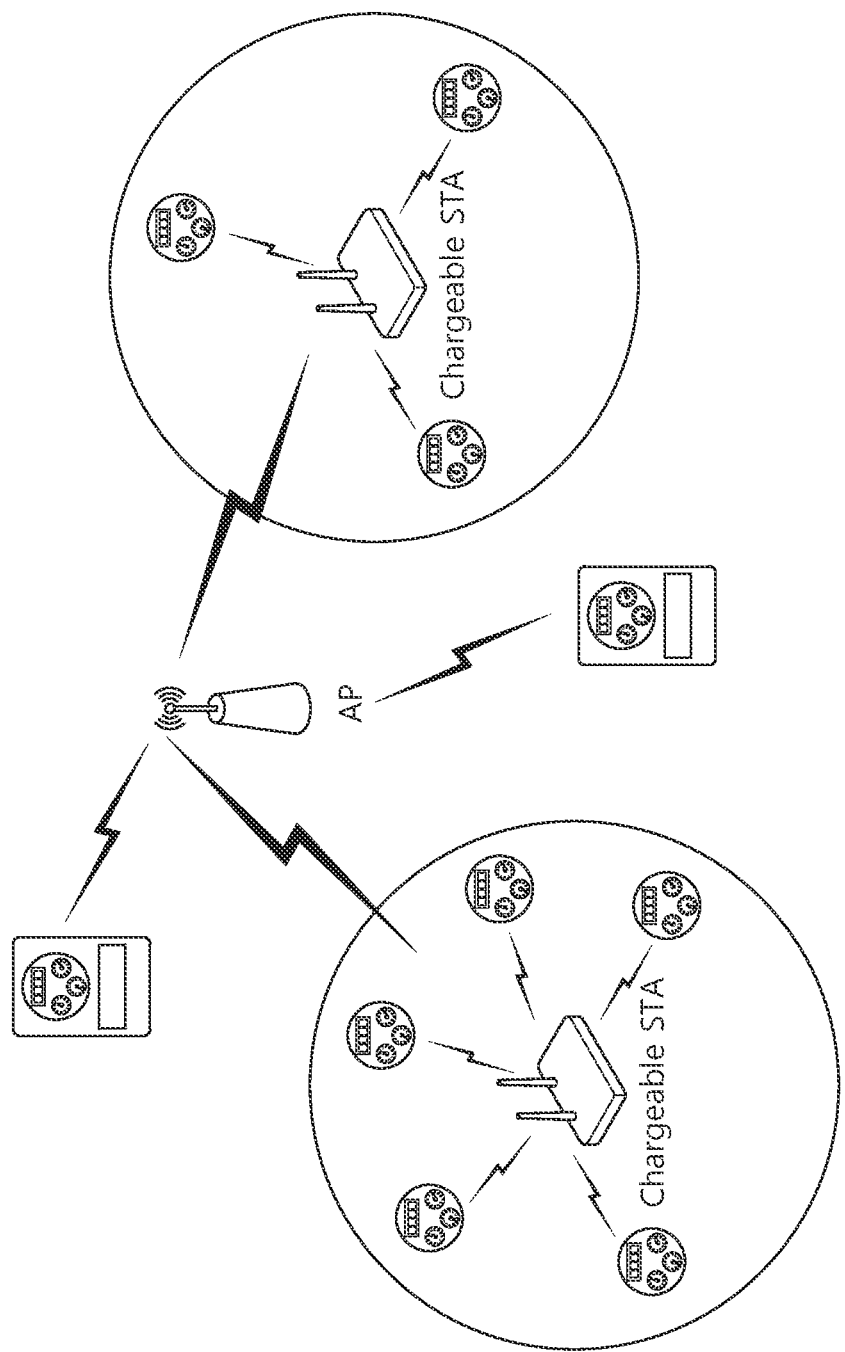
FIG. 6 is a diagram showing an example of an M2M WLAN system to which an embodiment of the present invention may be applied.

FIG. 6 is a diagram showing an example of an M2M WLAN system to which an embodiment of the present invention may be applied.

It is assumed that the M2M WLAN system shown in FIG. 6 includes an environment in which a number of STAs have accessed an AP. It is assumed that specific STAs of the STAs prefer near field low-power communication and communicate with an AP through a neighbor STA capable of providing a relay function. The STAs that prefer near field low-power communication may be, for example, battery-powered unchargeable M2M devices. The unchargeable M2M devices are hereinafter referred to as unchargeable STAs. STAs which provide a relay function between the unchargeable STAs and the AP may be battery-powered chargeable M2M devices. The devices are hereinafter referred to as chargeable STAs.

The chargeable STA may refer to an STA whose battery can be charged by a user, if necessary, at a position where the chargeable STA is installed by replacing or charging the battery. In contrast, the unchargeable STA may refer to an STA whose battery cannot be replaced owing to its position or several factors and whose battery has a capacity when the battery is first installed once the battery is installed. For the sake of convenience, an STA that prefers near field low-power communication is commonly designated as an 'unchargeable STA', and an STA capable of providing a relay function is commonly designated as a 'chargeable STA'. The unchargeable STA and the chargeable STA are names given for convenience of description, and it is evident that any device providing a relay function may belong to the chargeable STA in embodiments proposed by the present invention.

Referring to FIG. 6, the remaining STAs other than two chargeable STAs, from among STAs other than an AP, correspond to unchargeable STA. Each of the two chargeable STA can perform communication using full transmit power when communicating with the AP. Each of the two chargeable STA can perform transmission using low transmit power when communicating with peripheral low-power unchargeable STAs that are placed within a circle. In FIG. 6 an unchargeable STA placed outside the coverage of the chargeable STA illustrates an unchargeable STA which cannot discover a chargeable STA that will provide a relay function nearby or which communicates with an AP by using relatively high transmit power unlike other unchargeable STAs because it cannot discover a chargeable STA. In this communication system, it may be assumed that the unchargeable STA is directly associated with the AP and then the unchargeable STA communicates with the AP before it discovers a chargeable STA that provides a relay function to the unchargeable STA.

A method of an AP, a chargeable STA, and an unchargeable STA performing communication in an M2M WLAN system, such as that shown in FIG. 6, is described hereinafter. In particular, how a chargeable STA will support a relay function is described in detail.

An embodiment of the present invention provides a method in which a chargeable STA placed at near field performs communication by supporting a relay function while using relatively high power in order to increase the life span of unchargeable STAs in an M2M WLAN system. To this end, relay communication in a communication layer 2 (L2) step may be proposed. This may have a communication network structure of 2-hop or higher which is commonly called a mesh network. Meanwhile, if it is sought to embody relay communication in this mesh network structure, problems, such as the power consumption of a chargeable STA or complexity and time delay, may be added. Accordingly, there is proposed a communication method based on a relay protocol utilizing a communication layer 3 (L3) step so that a limited and maximum relay hop structure of about 1-hop or 2-hop is satisfied and packet forwarding between an AP and an unchargeable STA can be effectively performed.

In order to perform the packet forwarding through the L2, it is necessary for a chargeable STA to receive data including forwarding information. In order for the chargeable STA to receive the data and to be operated, pieces of information related to three or more addresses, including a transmission STA address, a reception STA address, and a destination STA address, need to be included in a transmission frame when a sender first transmits the transmission frame. That is, when a frame including forwarding information is received, the chargeable STA may determine whether it will transmit the frame to which hop based on the frame. A relay function can be supported by this L2 frame switching method. That is, in order to embody this L2 frame switching, a new packet forwarding method related to that the frame will be relayed on the L2 according to what method needs to be defined. Accordingly, complexity may be increased.

It is assumed that a frame transmission direction is called uplink when an unchargeable STA is a sender and an AP is a receiver and a frame transmission direction is called downlink when an AP is a sender and an unchargeable STA is a receiver, for convenience of description hereinafter. Furthermore, a communication method in uplink and a communication method in downlink are separately described.

First, the communication method of an unchargeable STA and a chargeable STA in uplink is described below with reference to the drawings.

Figure 7:
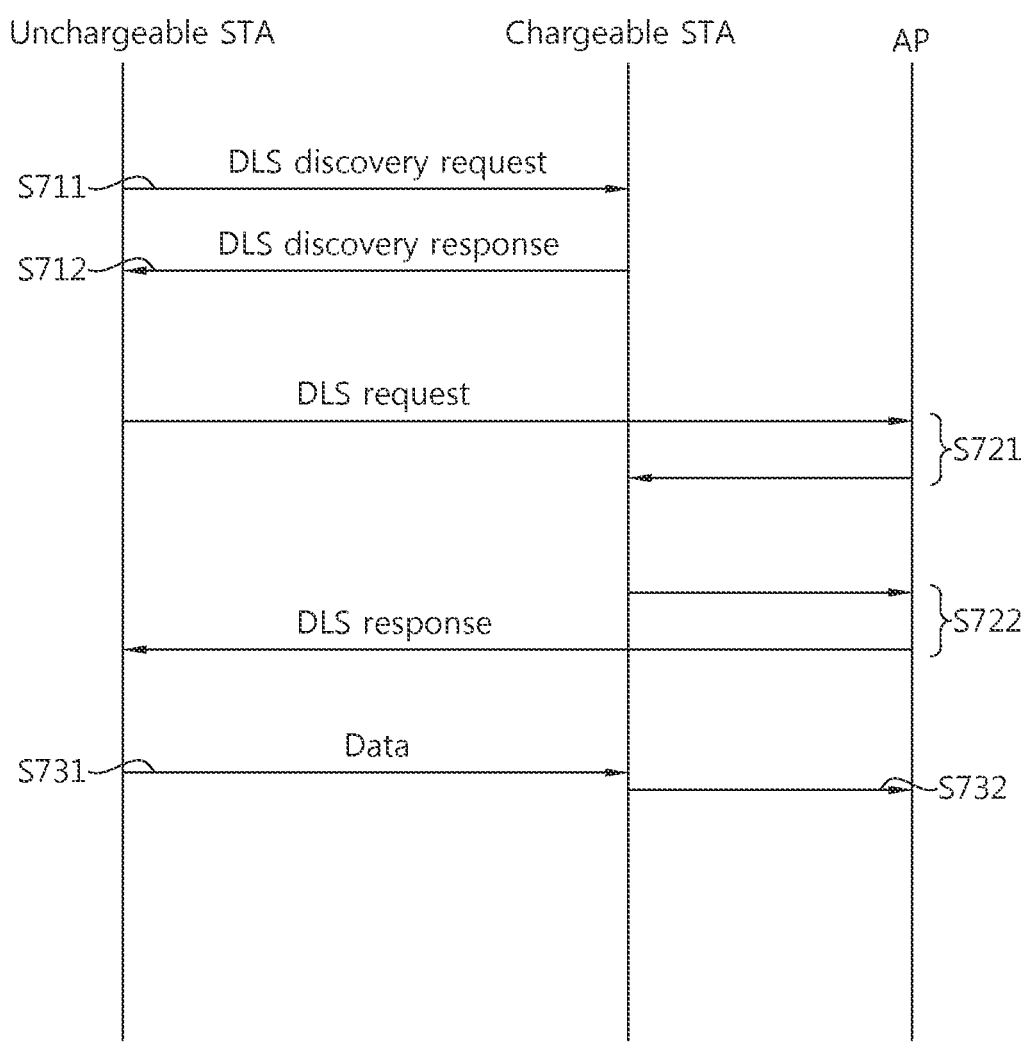
FIG. 7 is a diagram showing an uplink communication method according to an embodiment of the present invention.

FIG. 7 is a diagram showing an uplink communication method according to an embodiment of the present invention.

Referring to FIG. 7, an unchargeable STA performs a Direct Link Setup (DLS) process in order to set up a direct link with a chargeable STA that will become the gateway of the unchargeable STA. Prior to the DLS process, there is a need for a method of the unchargeable STA discovering the chargeable STA. To this end, there is proposed a method of the unchargeable STA broadcasting a DLS discovery request frame at step S711.

FIG. 8 is a block diagram showing the format of the DLS discovery request frame according to an embodiment of the present invention.

Referring to FIG. 8, the DLS discovery request frame 800 includes a category field 810, an action field 820, a length field 830, a full (or maximum) transmit power field 840, a location information field 850, a listen interval field 860, a duty cycle field 870, an STA type field 880, and a discovery timeout value field 890.

The category field 810 and the action field 820 are set to values indicating that the relevant frame is the DLS discovery request frame 800. The length field 830 may be set to indicate the length of the DLS discovery request frame 800 and/or the length of a bit sequence that forms the remaining fields subsequent to the length field 830.

The full transmit power field 840 is the maximum power of a transmitter, and it may indicate the full transmit power of an unchargeable STA.

The location information field 850 may include information about the location of a transmitter.

The listen interval field 860 may indicate a listen interval that is represented by a beacon interval related to a doze period.

The duty cycle field 870 may indicate a ratio of the time in an active state.

The STA type field 880 may indicate the application type of an unchargeable STA.

The discovery timeout value field 890 may indicate duration for which an unchargeable STA waits to receive a DLS discovery response frame after broadcasting the DLS discovery request frame 800.

Referring back to FIG. 7, after transmitting the DLS discovery request frame 400, the unchargeable STA may receive a DLS discovery response frame for duration indicated by the discovery timeout value field 490 at step S312. The unchargeable STA may receive one or more DLS discovery response frames from one or more chargeable STAs for the indicated duration.

Figure 9:
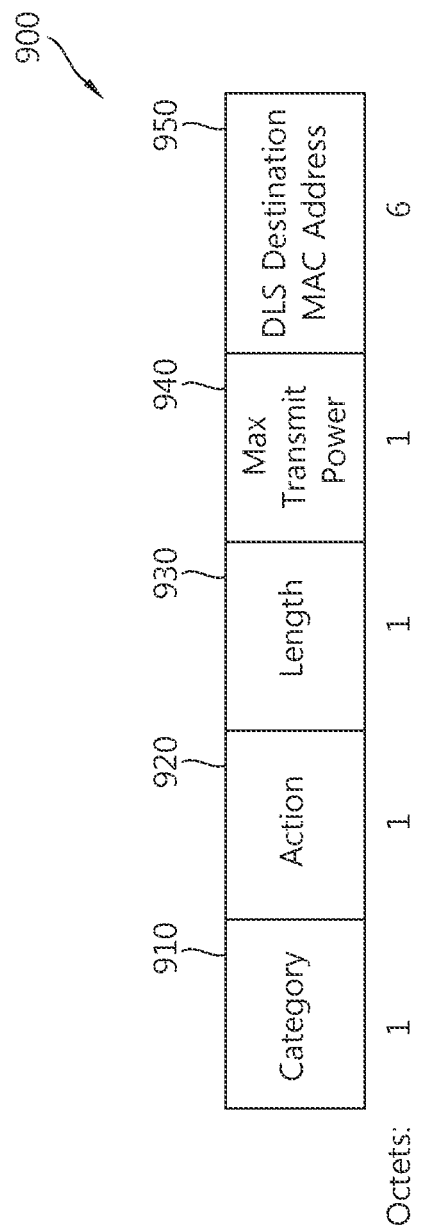
FIG. 9 is a block diagram showing the format of the DLS discovery response frame according to an embodiment of the present invention.

FIG. 9 is a block diagram showing the format of the DLS discovery response frame according to an embodiment of the present invention.

Referring to FIG. 9, the DLS discovery response frame 900 includes a category field 910, an action field 920, a length field 930, a full (or maximum) transmit power field 940, and a DLS destination address field 950.

The category field 910 and the action field 920 may be set to indicate that the relevant frame is the DLS discovery response frame 900.

The length field 930 may indicate the length of the DLS discovery response frame 900 and/or the length of a bit sequence that forms the remaining fields subsequent to the length field 930.

The full transmit power field 940 may indicate the same value as a value indicated by the full transmit power field 840 of the DLS discovery request frame 800 or may indicate a value different from a value indicated by the full transmit power field 840 of the DLS discovery request frame 800. If the full transmit power field 940 indicates a value different from a value indicated by the full transmit power field 840 of the DLS discovery request frame 800, the unchargeable STA that has received the DLS discovery response frame 900 uses transmit power smaller than the full transmit power indicated by the full transmit power field 940 when transmitting a radio signal to the chargeable STA.

The DLS destination address field 950 may indicate the MAC address of a chargeable STA. The unchargeable STA may check the MAC address of a chargeable STA when receiving the DLS discovery response frame 900. An unchargeable STA may perform a DLS procedure along with a chargeable STA by using the MAC address indicated by the DLS destination address field 950. That is, the unchargeable STA may request to set up a direct link by transmitting a DLS frame, including the MAC address of the chargeable STA, to the chargeable STA.

Referring back to FIG. 7, the unchargeable STA sets up a direct link with the chargeable STA after discovering the chargeable STA. The direct link may be set up in such a manner that the unchargeable STA transmits a DLS request frame, including the MAC address of the chargeable STA, to the chargeable STA via an AP at step S721 and in response thereto, the chargeable STA transmits a DLS response frame to the unchargeable STA via the AP at step S722.

After the direct link with the one chargeable STA is set up through the above-described method, the unchargeable STA transmits a frame by using a method of setting the final gateway using a routing protocol at the IP terminal. In this case, the present invention proposes a method of setting a chargeable STA not an AP or a final destination STA as the gateway and transmitting data. That is, when the chargeable STA receives the frame, L3 connection is formed between two devices; the unchargeable STA and the chargeable STA. In this state, the chargeable STA that has a frame forwarded thereto may perform relay by using a method of forming connection between a next destination STA, such as an AP (or eventually up to a router) and the chargeable STA through L3.

For example, when the unchargeable STA transmits a data frame to the AP, the unchargeable STA sets the address of the AP as a destination STA address and transmits the data frame to the chargeable STA at step S731. After checking that the destination STA address of the data frame received from the unchargeable STA is the AP, the chargeable STA relays the data frame to the AP at step S732.

The data frame may be transmitted from the unchargeable STA to the chargeable STA through the direct link set up between the two STAs. The data frame may be transmitted with transmit power equal to or smaller than full transmit power indicated by the full transmit power field included in the DLS discovery response frame.

In a communication environment, such as that shown in FIG. 6, the distance between the unchargeable STA and the chargeable STA is closer than the distance between the unchargeable STA and the AP. Accordingly, in order to limit full transmit power that may be used by the chargeable STA, transmit power indicated by the full transmit power field 940 of the DLS discovery response frame 900 may be set to indicate limited transmit power so that frames can be exchanged through the direct link between the chargeable STA and the unchargeable STA. The limited transmit power may be set to a value smaller than transmit power that has been used by the unchargeable STA in order to transmit a frame to the existing AP. In this case, there is an advantage in that the power consumption of the unchargeable STA can be reduced.

To this end, the chargeable STA may determine a full transmit power value that is indicated by the full transmit power field 940 of the DLS discovery response frame 900 on the basis of information about the location of the unchargeable STA, indicated by the location information field 850 of the DLS discovery request frame 800, and/or the full transmit power of the chargeable STA indicated by the full transmit power field 840. For example, a value indicated by the full transmit power field 940 of the DLS discovery response frame 900 may be set to be smaller than a value indicated by the full transmit power field 840 of the DLS discovery request frame 800 so that the transmit power of the unchargeable STA is limited.

In the M2M WLAN system described above with reference to FIGS. 6 to 9, when a direct link is set up between a chargeable STA and an unchargeable STA, downlink communication from an AP to the unchargeable STA may be performed by using various methods. The AP may transmit a data frame to the unchargeable STA directly. The AP can transmit the data frame to the unchargeable STA directly because it has wide service coverage and may use relatively high transmit power. Furthermore, an AP may first transmit a data frame, intended to be transmitted to an unchargeable STA, to a chargeable STA, and thereafter the chargeable STA may relay the data frame to the unchargeable STA.

Meanwhile, in a WLAN system in which a direct link has been set up between a chargeable STA and an unchargeable STA, it is necessary to discuss a TIM protocol for the unchargeable STA. In the above-described WLAN system, in order to reduce power on the unchargeable STA side, what the chargeable STA supports relay in both uplink communication and downlink communication has been discussed to be efficient. In addition, a TIM protocol based on relay may be proposed. A TIM relay mechanism proposed by the present invention is described below.

An STA that supports a relay function, such as a chargeable STA, may receive a beacon frame including a TIM element and being periodically transmitted by an AP and relay the TIM element to others adjacent to the STA through transmission using low power. This TIM protocol may be called a TIM relay protocol. The TIM relay protocol is a mechanism that enables a low-power STA, such as an unchargeable STA, to check whether an AP has buffered traffic for the low-power STA based on a TIM element relayed instead of a beacon frame transmitted by the AP. Accordingly, a power reduction effect can be achieved because the unchargeable STA operating with low power does not need to necessarily receive the beacon frame from the AP.

Figure 10:
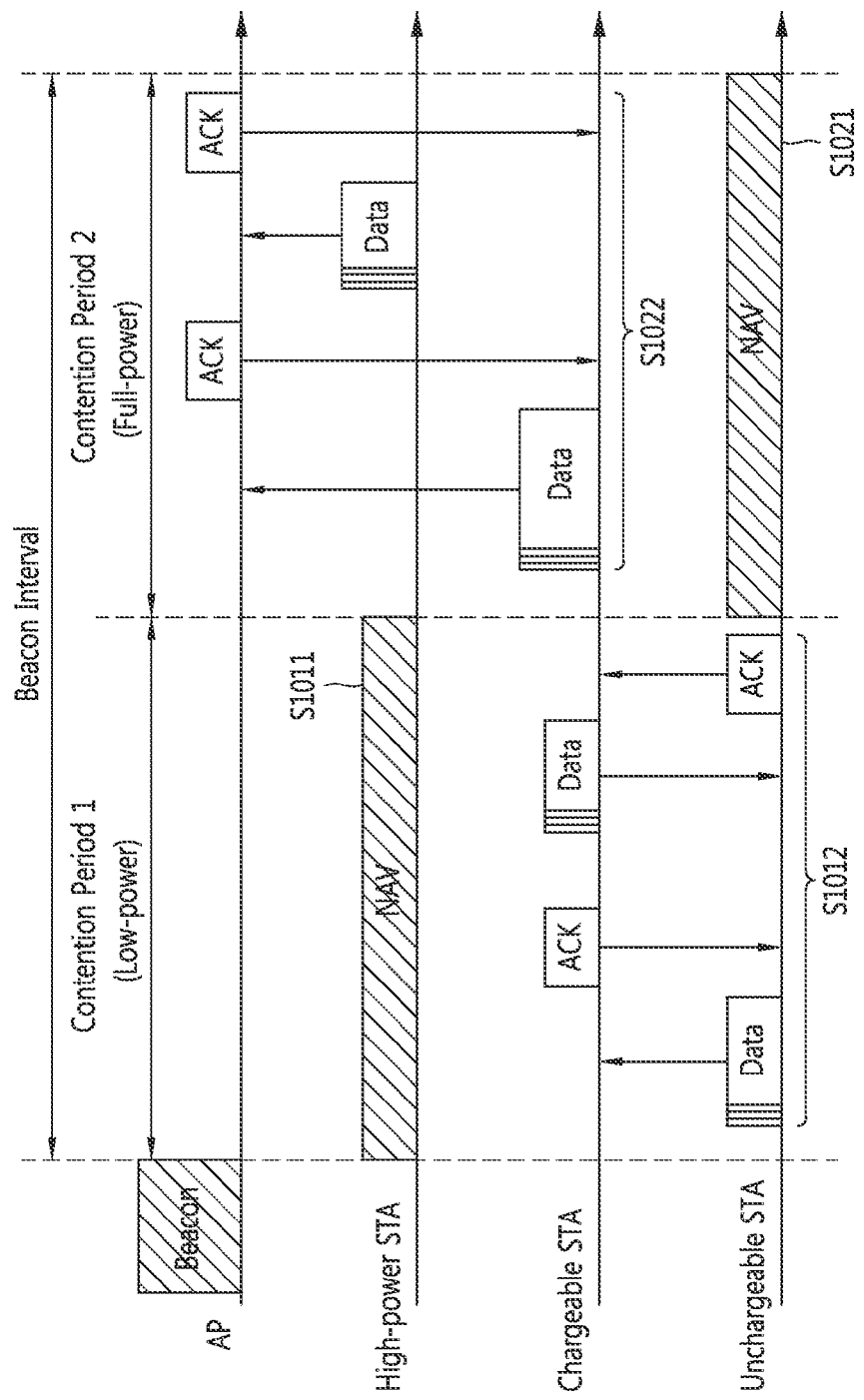
FIG. 10 is a diagram showing a communication method based on the relay mechanism that may be applied to an embodiment of the present invention.

First, a basic relay mechanism for the TIM relay protocol may be illustrated as shown in FIG. 10. FIG. 10 is a diagram showing a communication method based on the relay mechanism that may be applied to an embodiment of the present invention. The relay mechanism to be described with reference to FIG. 10 may be applied to an M2M WLAN system, such as that shown in FIG. 6. The M2M WLAN system may be formed of an AP, a chargeable STA, and an unchargeable STA. In FIG. 10, a high-power STA may mean an STA which is placed within the service coverage of an AP and is able to directly exchange frames with the AP by using high transmit power.

Referring to FIG. 10, the AP transmits a beacon frame periodically. A first contention period Contention Period 1 and a second contention period Contention Period 2 are configured within one beacon interval. For a time interval corresponding to the first contention period, transmit power is limited to a specific range or less and only low-power transmission is permitted. Information about the first contention period may be indicted through the beacon frame of the AP. Accordingly, a high-power STA configures a Network Allocation Vector (NAV) for the first contention period at step S1011. For the first contention period, the chargeable STA and the unchargeable STA may exchange frames by using low-power transmission at step S1012.

After the first contention period elapses, the second contention period is started. The second contention period corresponds to a full power transmission period. For the second contention period, the transmission and reception of radio signals of a low-power STA, such as an unchargeable STA, are limited. Accordingly, the unchargeable STA configures an NAV for the second contention period at step S1021.

For the first contention period, the chargeable STA may relay an uplink frame intended to be transmitted to the AP, from among data frames exchanged with the unchargeable STA through low-power transmission and reception, to the AP if there is the uplink frame. If the chargeable STA relays the data frame intended to be transmitted from the unchargeable STA to the AP, it may transmit the data frame by using the full transmit power. Furthermore, the chargeable STA may receive a downlink data frame that is intended to be transmitted from the AP to the unchargeable STA for the second contention period. In this case, the chargeable STA may buffer the data frame until a new first contention period is started without transmitting the data frame to the unchargeable STA immediately.

A relay mechanism, such as that shown in FIG. 10, may be applied to a TIM protocol that is operated between an AP and an STA which form a WLAN system.

If an AP transmits a TIM element through a beacon frame, a chargeable STA may receive the TIM element and relay them to an unchargeable STA according to the following method.

A low-power beacon: Another type beacon may be periodically transmitted with low power for a period in which only low-power transmission is permitted, such as the first contention period, based on a relay mechanism, such as that shown in FIG. 10. A TIM element transferred from an AP through the low-power beacon may be transmitted without change, or a TIM element having another format for a low-power STA, such as an unchargeable STA associated with the AP, may be transmitted.

A short beacon: Another type beacon may be periodically transmitted with low power for a period in which only low-power transmission is permitted, such as the first contention period, based on a relay mechanism, such as that shown in FIG. 10. In this case, the beacon frame, unlike a common beacon frame, may have the same format as a short beacon frame including a specific information element. TIM element transmitted by an AP through the short beacon frame may be transmitted without change, or the short beacon frame including a deformed TIM element for an unchargeable STA may be transmitted.

Figure 11:
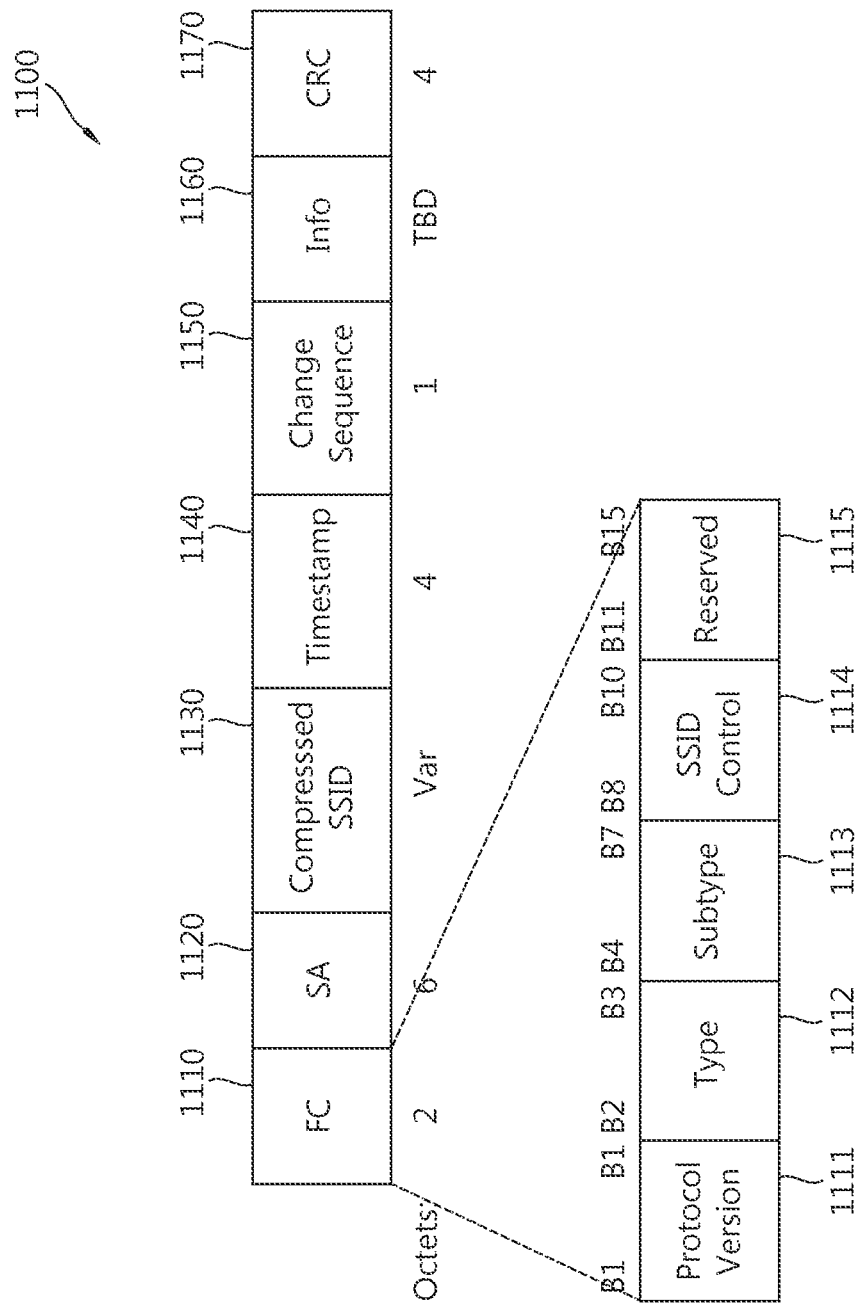
FIG. 11 is a block diagram showing the format of the short beacon frame according to an embodiment of the present invention.

FIG. 11 is a block diagram showing the format of the short beacon frame according to an embodiment of the present invention. Referring to FIG. 11, the short beacon frame 1100 may include a Frame Control (FC) field 1110, a Source Address (SA) field 1120, a compressed SSID field 1130, a time stamp field 1140, a change sequence field 1150, an information field 1160, and a CRC field 1170.

The frame control field 1110 may include at least one of a protocol version subfield 1111, a type subfield 1112, a subtype subfield 1113, an SSID control subfield 1114, and reserved bits 1115. The FC field 1110 may include at least one subfield so that it may indicate WLAN specifications supporting the short beacon frame 1100, from among all the subfields within the FC field of the existing MAC frame. The SSID control subfield 1114 may indicate the type of a compressed SSID.

The SA field 1120 indicates the address of a source STA that transmits the short beacon frame 1100.

The compressed SSID field 1130 may include information about a real SSID which has been compressed through a specific method.

The time stamp field 1140 may include the following information for timing synchronization purposes through the short beacon frame 1110.

The change sequence field 1150 may include information about whether a specific major message included in the short beacon frame 1100 or a common beacon frame has been changed. An STA that has received the change sequence field 1150 may determine whether to also receive a common beacon frame with reference to the change sequence field 1150.

The information field 1160 may include other pieces of information about the short beacon frame 1100. The CRC 1170 may include information for detecting an error in the short beacon frame 1100.

The TIM broadcast: A chargeable STA may relay a TIM element, received from an AP, to an unchargeable STA in the form of an additional frame having a format, such as the TIM broadcast, for a period in which only low-power transmission is permitted, such as the first contention period, based on a relay mechanism, such as that shown in FIG. 10. In this case, the chargeable STA may relay the TIM element, received from the AP, to the unchargeable STA without change or may transmit the TIM element having another format for an unchargeable STA, such as a low-power STA associated with the chargeable STA, to the unchargeable STA.

The other management frame: A chargeable STA may relay a TIM element, received from an AP, to an unchargeable STA by transmitting an additional and specific management frame to the unchargeable STA for a period in which only low-power transmission is permitted, such as the first contention period, based on a relay mechanism, such as that shown in FIG. 10. This management frame may be called a relayed TIM frame.

Figure 12:
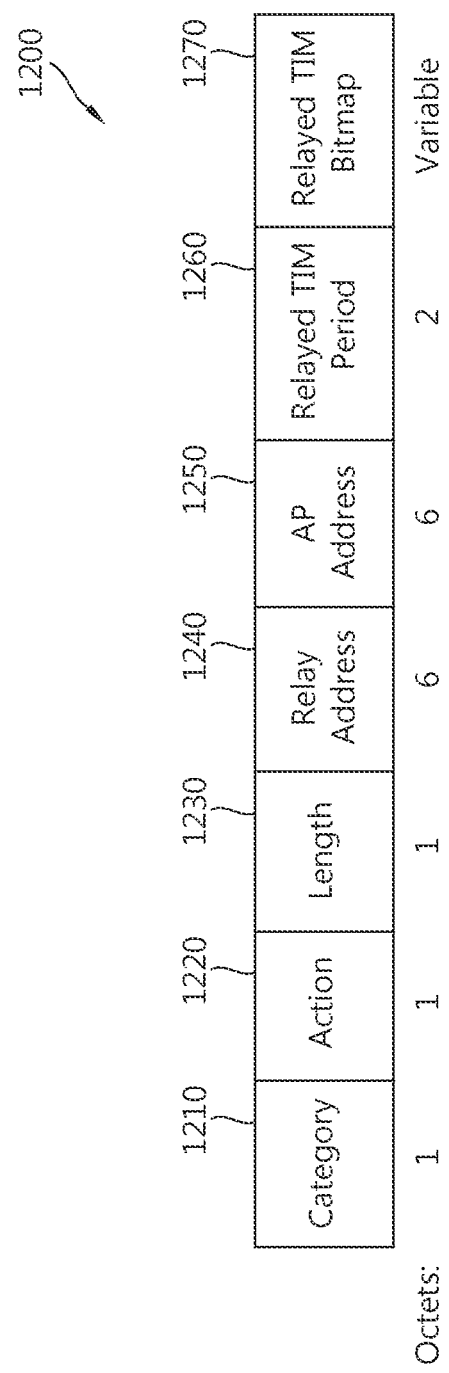
FIG. 12 is a block diagram showing the format of a relayed TIM frame according to an embodiment of the present invention.

FIG. 12 is a block diagram showing the format of a relayed TIM frame according to an embodiment of the present invention.

Referring to FIG. 12, the relayed TIM frame 1200 may include a category field 1210, an action field 1220, a length field 1230, a relay address field 1240, an AP address field 1250, a relayed TIM period field 1260, and a relayed TIM bitmap field 1270.

The category field 1210 and the action field 1220 may indicate that a frame is the relayed TIM frame 1200.

The length field 1230 may indicate the entire length of the relayed TIM frame 1200 or may indicate the length of a bit sequence that forms the remaining fields after the length field 1230.

The relay address field 1240 may indicate the MAC address of a chargeable STA that transmits the relayed TIM frame 1200.

The AP address field 1250 may indicate the MAC address of an AP that has transmitted a TIM element related to the relayed TIM frame 1200.

The relayed TIM period field 1260 may indicate a transmission cycle in which the relayed TIM frame 1200 is periodically transmitted. The transmission cycle may be represented in a real time unit.

The relayed TIM bitmap field 1270 may indicate whether there is buffered traffic to be transmitted from an AP to an unchargeable STA or not. The relayed TIM bitmap field 1270 may be embodied to have a bitmap format. If a bit corresponding to a specific index of the bitmap is set to '1', it may indicate that there is buffered traffic for an unchargeable STA corresponding to the index.

The fields included in the above relayed TIM frame 1200 may be included as fields that form a TIM element having another type which is included in the short beacon and the low-power beacon.

Meanwhile, an unchargeable STA may request a specific chargeable STA to transmit a relayed TIM frame thereto. To this end, the unchargeable STA may transmit a TIM relay request frame to the chargeable STA. That is, when the relayed TIM frame 1200 having a format, such as that shown in FIG. 12, is first received from any adjacent chargeable STA, the unchargeable STA may also request the chargeable STA to inform the unchargeable STA whether there is buffered traffic through the relayed TIM frame. That is, the unchargeable STA may request that an indication bit for the unchargeable STA be included in the relayed TIM bitmap field 1270 of the relayed TIM frame 1200.

Figure 13:
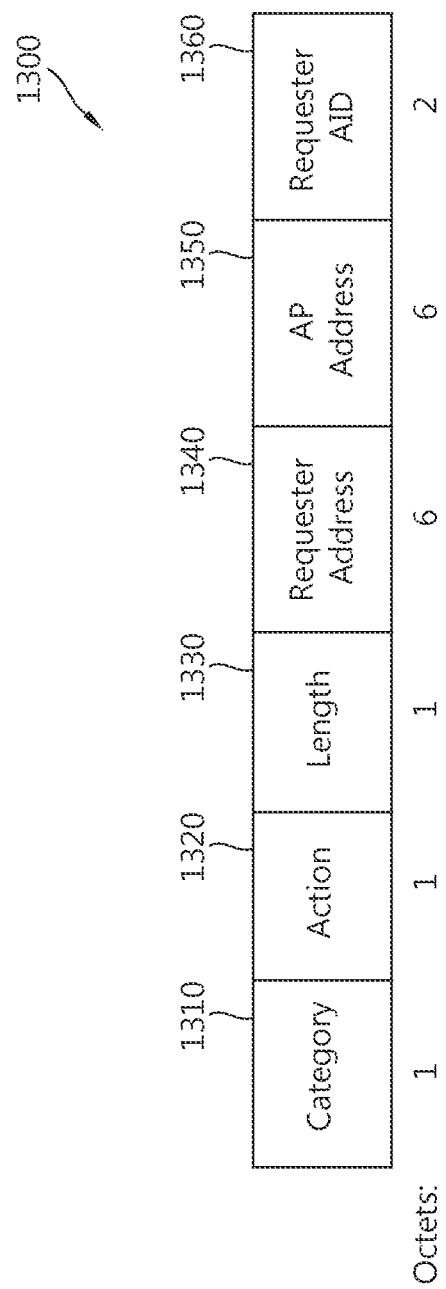
FIG. 13 is a block diagram showing the format of a TIM relay request frame according to an embodiment of the present invention.

FIG. 13 is a block diagram showing the format of a TIM relay request frame according to an embodiment of the present invention.

Referring to FIG. 13, the TIM relay request frame 1300 may include a category field 1310, an action field 1320, a length field 1330, a requester address field 1340, an AP address field 1350, and a requester Association ID (AID) field 1360.

The category field 1310 and the action field 1320 may indicate that a frame is the TIM relay request frame 1300.

The length field 1330 may indicated the length of the TIM relay request frame 1300 or may indicate the length of a bit sequence that forms the remaining fields after the length field 1330.

The requester address field 1340 may indicate the MAC address of an unchargeable STA that requests TIM relay.

The AP address field 1350 may indicate the MAC address of an AP with which an unchargeable STA is associated.

The requester AID field 1360 may include identification information for identifying an unchargeable STA that transmits the TIM relay request frame 1300. The identification information may be an AID allocated when the unchargeable STA is associated with an AP.

A chargeable STA that has received the TIM relay request frame 1300 may transmit a TIM relay response frame to an unchargeable STA in response to the TIM relay request frame 1300.

Figure 14:
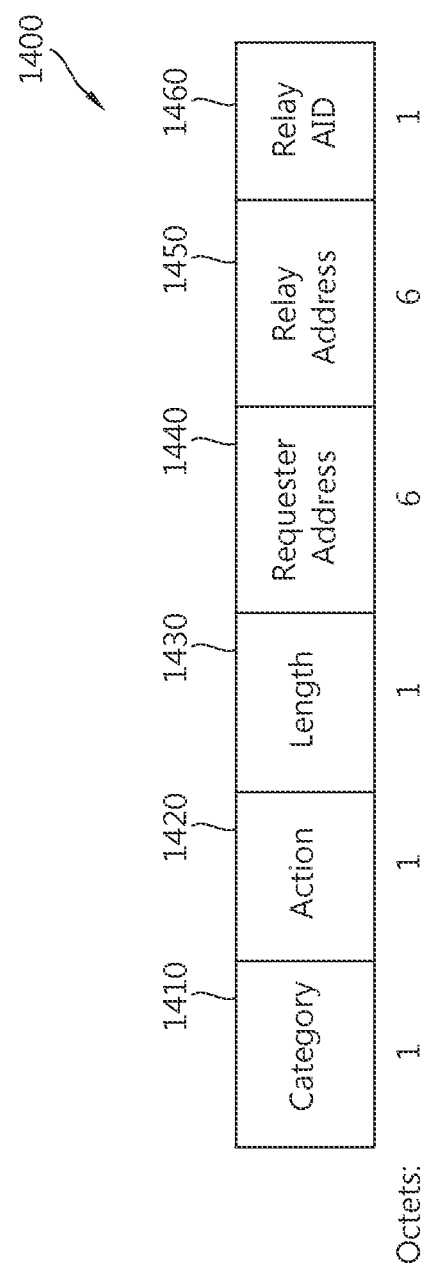
FIG. 14 is a block diagram showing the format of a TIM relay response frame according to an embodiment of the present invention.

FIG. 14 is a block diagram showing the format of a TIM relay response frame according to an embodiment of the present invention.

Referring to FIG. 14, the TIM relay response frame 1400 may include a category field 1410, an action field 1420, a length field 1430, a requester address field 1440, a relay address field 1450, and a relay AID field 1460.

The category field 1410 and the action field 1420 may be set to indicate that a frame is the TIM relay response frame 1400.

The length field 1430 may indicate the length of the TIM relay response frame 1400 or the length of a bit sequence that forms the remaining fields after the length field 1430.

The requester address field 1440 may indicate the MAC address of an unchargeable STA that has transmitted the TIM relay request frame 1300.

The relay address field 1450 may indicate the MAC address of an unchargeable STA that transmits the TIM relay response frame 1400.

The relay AID field 1460 may include identification information for identifying a communication link between an unchargeable STA and a chargeable STA. The identification information may indicate a relay AID. The relay AID may have a length of 6 octets. The relay AID may indicate that the bit of a specific index included in the relayed TIM bitmap field 1270 of the relayed TIM frame 1200 is a bit indicating whether buffered traffic for an unchargeable STA exists or not. That is, the value of a specific relay AID may indicate a specific bit in the bitmap sequence of the relayed TIM bitmap field 1270 of a relayed TIM frame to be subsequently transmitted. For example, when the relay AID is '3', it may mean that the third bit is an indication bit for an unchargeable STA. Meanwhile, the relay AID field 1460 may be set based on the identification information of an unchargeable STA that is indicated by the requester AID field 1360. The relay AID field 1460 independently set for each unchargeable STA that performs communication with a chargeable STA may be transmitted based on the relay AID field 1460.

In addition, when the relay AID field 1460 indicates a specific value, it may mean that a request of an unchargeable STA has been rejected. For example, when all bit sequences forming the relay AID field 1460 are set to '0', it may mean that a request of an unchargeable STA has been rejected. In some embodiments, an additional subfield may be placed in the TIM relay response frame in order to indicate whether a request of an unchargeable STA has been accepted or rejected. This indication method is only illustrative, and it is evident that the scope of the present invention includes various examples embodied to perform the function.

In accordance with the relay TIM protocol described with reference to FIGS. 10 to 14, an unchargeable STA switches to an awake state for a period in which low-power transmission and reception are permitted and receives TIM-related information transmitted by a chargeable STA. The TIM-related information may be the low-power beacon, the short beacon, the TIM broadcast and/or a TIM element and/or a processed TIM element included in the relayed TIM frame. The unchargeable STA may receive the TIM-related information relayed by the chargeable STA and check whether or not there is buffered traffic intended to be transmitted from an AP to the unchargeable STA.

If, as a result of the check, there is no buffered traffic intended to be transmitted thereto, the unchargeable STA may be operated in a doze state until next TIM-related information is received. If, as a result of the check, there is buffered traffic intended to be transmitted thereto, the unchargeable STA may maintain an awake state and receive a data frame from the chargeable STA. The unchargeable STA may receive the data frame directly from the AP not via the chargeable STA. The received data frame may be a data frame related to buffered traffic intended to be transmitted from the AP to the unchargeable STA. The unchargeable STA switches to a doze state at a point of time at which a period in which full-power transmission is permitted is started.

An unchargeable STA may receive relayed TIM-related information through a chargeable STA and may directly receive a data frame related to buffered traffic through an AP. In this case, the unchargeable STA may perform contention with high power and directly receive a data frame related to the buffered traffic from the AP.

The above-described TIM relay protocol enables an unchargeable STA to receive TIM-related information and receive buffered traffic based on the TIM-related information by using low power. Accordingly, an unchargeable STA can reduce power consumption. Furthermore, an unchargeable STA maintains an awake state for only a specific period in which low-power transmission and reception are possible and switches to a doze state for another specific period in which full-power transmission and reception are possible. Accordingly, an unchargeable STA can reduce unnecessary power consumption.

Figure 15:
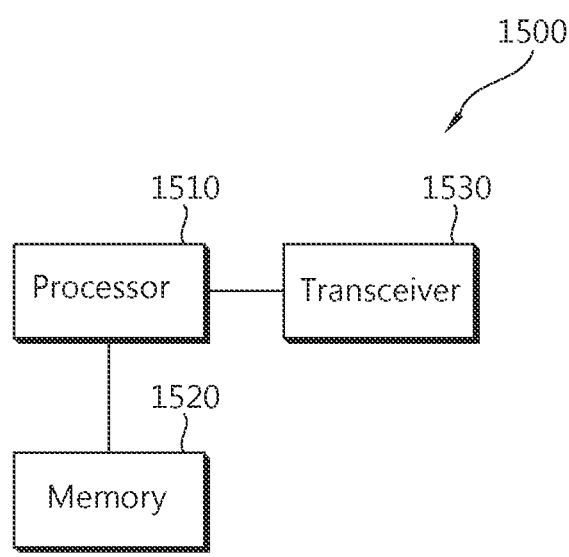
FIG. 15 is a block diagram showing a wireless apparatus to which the embodiments of the present invention may be applied.

FIG. 15 is a block diagram showing a wireless apparatus to which the embodiments of the present invention may be applied. The wireless apparatus may be an AP, a chargeable STA and/or an unchargeable STA.

Referring to FIG. 15, the wireless apparatus 1500 includes a processor 1510, memory 1520, and a transceiver 1530. The transceiver 1530 transmits and receives radio signals, and the physical layer of IEEE 802.11 is embodied in the transceiver 1530. The processor 1510 is functionally connected to the transceiver 1530 and is configured to embody the MAC layer and the physical layer of IEEE 802.11. The processor 1510 may transmit and/or receive a Direct Link Setup (DLS) discovery request frame in order to discover one or more chargeable STAs. The processor 1510 may be embodied to perform a procedure of exchanging a DLS request frame and a DLS response frame in order to perform DLS between a chargeable STA and/or an unchargeable STA. The processor 1510 may be embodied to relay a frame, transmitted by an unchargeable STA, to an AP. The processor 1510 may be embodied to receive a frame that is intended to be transmitted from an AP to an unchargeable STA and to relay the received frame to the unchargeable STA. The processor 1510 may be embodied to relay information related to the TIM element according to the embodiment of the present invention. The processor 1510 may be embodied to exchange TIM relay request and response frames for relaying the TIM element according to the embodiment of the present invention. The processor 1510 may be configured to implement the above-described embodiment of the present invention described with reference to FIGS. 6 to 14.

The processor 1510 and/or the transceiver 1530 may include Application-Specific Integrated Circuits (ASICs), other chipsets, logic circuits, or data processors or all of them. The memory 1520 may include Read-Only Memory (ROM), Random Access Memory (RAM), flash memory, memory cards, storage media and/or other storage devices. When the above-described embodiment is embodied in software, the above-described scheme may be embodied by using a module (process or function) that performs the above function. The module may be stored in the memory 1520 and executed by the processor 1510. The memory 1520 may be placed inside or outside the processor 1510 and may be connected to the processor 1510 using a variety of well-known means While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for communicating in a Wireless Local Area Network (WLAN) system, the method comprising:
   receiving, by a relay station (STA) from an Access Point (AP), a first beacon frame including a first traffic indication map (TIM) element;
   generating, by the relay STA, a second beacon frame by including a part of the first TIM element, which is allocated for a receiving STA; and
   transmitting, by the relay STA, the second beacon frame to the receiving STA after receiving the first beacon frame,
   wherein the second beacon frame includes a second TIM element generated based on the first TIM element,
   wherein the first TIM element includes a first bitmap indicating whether buffered data for at least one STA associated with the AP is present or not, and
   wherein the second TIM element includes a second bitmap indicating whether buffered data for the receiving STA is present or not,
   wherein the method further comprises:
      receiving, by the relay STA, a TIM request frame from the receiving STA; and
      configuring, by the relay STA, a network with the receiving STA by transmitting a TIM relay response frame as a response to the TIM request frame,
      wherein the TIM relay request frame includes information on an identifier of the AP,
      wherein the TIM relay response frame includes information on an identifier of the relay STA, and
      wherein the relay STA is capable of being supplied by power.

2. The communication method of claim 1, wherein the second TIM element includes the second bitmap indicating the buffered data for the receiving STA when the first bitmap indicates the buffered data for the receiving STA.

3. A relay station (STA) for communicating in a Wireless Local Area Network (WLAN) system, the relay STA comprising:
   a transceiver configured to transmit and receive radio signals; and
   a processor operatively connected to the transceiver and configured to:
      receive, from an Access Point (AP), a first beacon frame including a first traffic indication map (TIM) element;
      generate a second beacon frame by including a part of the first TIM element, which is allocated for a receiving STA; and
      transmit the second beacon frame to the receiving STA after receiving the first beacon frame;
      wherein the second beacon frame includes a second TIM element generated based on the first TIM element,
      wherein the first TIM element includes a first bitmap indicating whether buffered data for at least one STA associated with the AP is present or not, and
      wherein the second TIM element includes a second bitmap indicating whether buffered data for the receiving STA is present or not,
   wherein the processor is further configured to:
      receive a TIM request frame from the receiving STA, and
      configure a network with the receiving STA by transmitting a TIM relay response frame as a response to the TIM request frame,
      wherein the TIM relay request frame includes information on an identifier of the AP,
      wherein the TIM relay response frame includes information on an identifier of the relay STA, and
      wherein the relay STA is capable of being supplied by power.

4. The method of claim 1, wherein the second beacon frame includes information to determine a contention period for receiving the buffered data for the receiving STA indicated by the second bitmap.

5. The method of claim 1, further comprising:
   transmitting, by the relay STA to the receiving STA, information to determine a transmission power of the receiving STA.

6. The method of claim 5, wherein the second beacon frame includes information to indicate that the second beacon frame includes a part of information indicating the buffered data for the at least one STA associated with the AP.

7. The method of claim 6,
   wherein the second beacon frame includes information to determine a contention period to receive the buffered data for the receiving STA indicated by the second bitmap,
   wherein the receiving STA changes to an awake state to receive the buffered data for the receiving STA based on the information to determine the contention period when presence of the buffered data for the receiving STA is indicated by the second bitmap, and
   wherein the receiving STA maintains a doze state to receive a multicast frame and a broadcast frame from the relay STA even if the presence of the buffered data for the receiving STA is not indicated by the second bitmap when the second beacon frame is a delivery traffic indication map (DTIM) frame.

8. The relay STA of claim 3, wherein the second TIM element includes the second bitmap indicating the buffered data for the receiving STA when the first bitmap indicates the buffered data for the receiving STA.

9. The relay STA of claim 3, wherein the second beacon frame includes information to determine a contention period for receiving the buffered data for the receiving STA indicated by the second bitmap.

10. The relay STA of claim 3, wherein the processor is further configured to transmit information to determine a transmission power of the receiving STA to the receiving STA.

11. The relay STA of claim 10, wherein the second beacon frame includes information to indicate that the second beacon frame includes a part of information indicating the buffered data for the at least one STA associated with the AP.

12. The relay STA of claim 11,
wherein the second beacon frame includes information to determine a contention period to receive the buffered data for the receiving STA indicated by the second bitmap,
wherein the receiving STA changes to an awake state to receive the buffered data for the receiving STA based on the information to determine the contention period when presence of the buffered data for the receiving STA is indicated by the second bitmap, and
wherein the receiving STA maintains a doze state to receive a multicast frame and a broadcast frame from the relay STA even if the presence of the buffered data for the receiving STA is not indicated by the second bitmap when the second beacon frame is a delivery traffic indication map (DTIM) frame.

\* \* \* \* \*